Dec. 22, 1964         R. A. HITCH ETAL         3,162,320
BODY MEMBER CONNECTING MECHANISM
Filed June 22, 1961                                  7 Sheets-Sheet 1

INVENTORS
R. A. HITCH
BY W. A. BERTOLINI
C. O. SMITH
Robb+Robb
attorneys

Fig. 6

INVENTORS
R. A. HITCH
BY W. A. BERTOLINI
C. O. SMITH
Robb & Robb
attorneys Dec. 22, 1964  R. A. HITCH ETAL  3,162,320
BODY MEMBER CONNECTING MECHANISM
Filed June 22, 1961  7 Sheets-Sheet 4

INVENTORS
R. A. HITCH
BY W. A. BERTOLINI
C. O. SMITH
Robb & Robb
Attorneys

Dec. 22, 1964    R. A. HITCH ETAL    3,162,320
BODY MEMBER CONNECTING MECHANISM
Filed June 22, 1961    7 Sheets-Sheet 5

INVENTORS
R. A. HITCH
BY W. A. BERTOLINI
C. O. SMITH
Robb & Robb
Attorneys

Dec. 22, 1964    R. A. HITCH ETAL    3,162,320
BODY MEMBER CONNECTING MECHANISM
Filed June 22, 1961    7 Sheets-Sheet 6

INVENTORS
R. A. HITCH
BY W. A. BERTOLINI
C. O. SMITH
Robb & Robb
attorneys

Dec. 22, 1964   R. A. HITCH ETAL   3,162,320
BODY MEMBER CONNECTING MECHANISM
Filed June 22, 1961   7 Sheets-Sheet 7

INVENTORS
R. A. HITCH
BY W. A. BERTOLINI
C. O. SMITH
Robb & Robb
attorneys

United States Patent Office 3,162,320
Patented Dec. 22, 1964

3,162,320
BODY MEMBER CONNECTING MECHANISM
Robert A. Hitch, Milford, N.J., and William A. Bertolini, Seaford, and Calvin O. Smith, Chappaqua, N.Y., assignors to Highway Trailer Industries, Inc., Edgerton, Wis., a corporation of Delaware
Filed June 22, 1961, Ser. No. 130,444
18 Claims. (Cl. 220—23.4)

This invention relates to body construction, and primarily to such construction in which the body is comprised of containers or container units which are separable and susceptible of assembly with other like units.

The present day requirements for handling freight, make it most desirable to provide for such handling in a manner which will reduce the actual manipulation of the freight and thereby the cost of such handling, by assembly of products or commodities into individual packages so to speak, these comprising relatively small or smaller units which may be termed containers, such containers being thereafter assembled in any preferred order with like containers whereby freight going to different destinations may do so without handling of the individual components of such freight.

With the foregoing in mind therefore it is desirable to provide for handling of these containers as a body which may be moved along the highway as the same is incorporated in a trailer to be moved by a prime mover such as a tractor, or in the alternative handle the containers as containers, place them on shipboard or on rail cars in individual or assembled condition.

With the foregoing generally outlined problem and some of the related problems associated therewith, in mind, it is a principal object of this invention to provide body structure which is essentially comprised of a plurality of containers, such structure being susceptible of having the containers assembled in any preferred order and when connected together act as structurally integrated parts, the body thus formed being usable as a trailer unit, to connect to a tractor and moved over the highway.

It is a further object of the invention, to provide the structurally integrated arrangement heretofore suggested, with means for separating the body into individual elements as containers or as individual trailer units for use to carry freight without the necessity to transfer items in the freight from one trailer body to another, thus facilitating materially the handling of such freight as will be apparent.

Another object of this invention is to provide body structure in which the means for assembling the containers into a unified structurally integrated body, include shear and tension members arranged in such a manner that will assist in the assembly of the container units in any preferred order, the containers being formed so as to include connecting elements or instrumentalities which will facilitate such assembly and disassembly with means for releasably effecting the inter engagement suggested by the foregoing.

Yet another object of this invention is to provide body structure in which the containers comprising the same, are arranged for end to end connection, gathering means being incorporated in such connections so that when one container is used as a trailer body another container similarly arranged may be connected thereto and as such structurally effectively integrated therewith.

Yet a further object of this invention is to provide trailer structure in which the containers comprising the same are adapted to have wheel units associated therewith, either as a combined container assembly and thus as a single body whether one or a plurality of units is used, or as separate trailer units with regard to which individual wheel assemblies may be arranged so as to support the containers as separate trailers for movement by tractor units.

Other and further objects of the invention will be understood from a consideration of the specification appended hereto and disclosed in the drawings wherein:

Referring now to FIGURES 1 to 4 inclusive initially, it will be seen that a container unit generally designated 1 is arranged about in alignment with a similar container unit 2, each of the containers being equipped with its own landing gear such as 3 and 4 with the bogie units 5 and 6 likewise supporting the same in position for subsequent manipulation as will be described.

Figure 7:
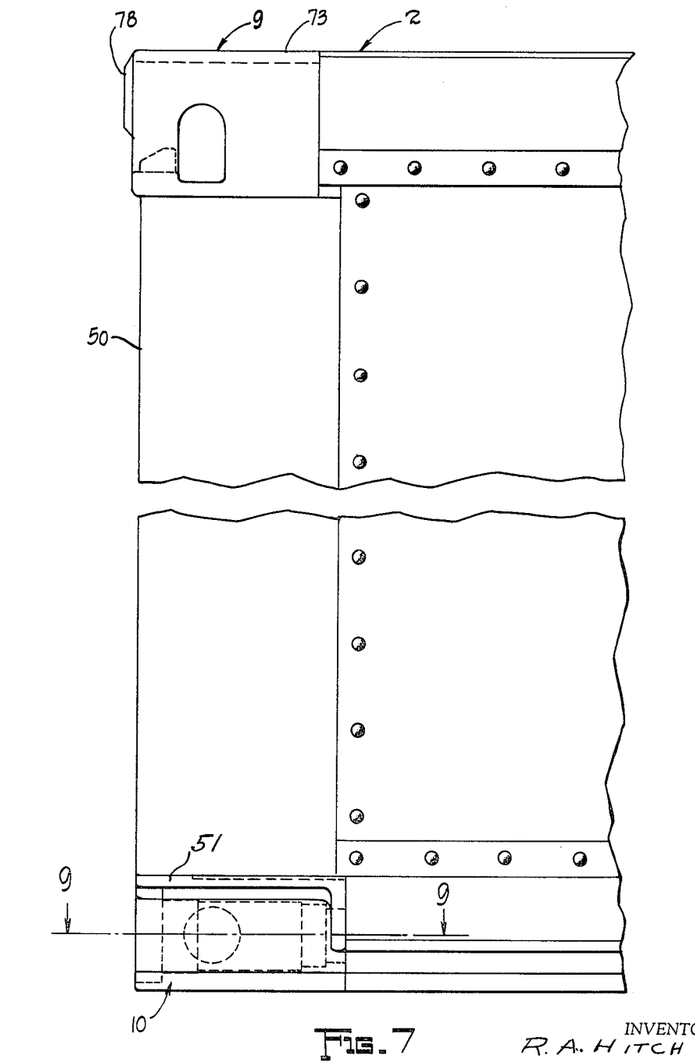
FIGURE 7 is a view corresponding to FIGURE 6 indicating the mating portions of the gathering means and their location on a fragmentary forward section of an adjacent container unit.

Each of the container units 1 and 2 is equipped with suitable gathering means arranged in the front and rear portions thereof, such gathering means including members generally suggested in the container 1 as comprising the male means 7 and 8, shown in enlarged and in more particular detail in FIGURE 7 as the male units, such units being adapted to engage mating female units 9 and 10, more particularly illustrated in enlarged detail in FIGURE 7.

Each of the trailer units 1 and 2 is similarly equipped, at its forward and rear portions or front and rear ends so to speak in an identical manner, although the means 7 and 8 of the container unit 2 are not shown in extended position for reasons which will be apparent as this description proceeds.

Figure 6:
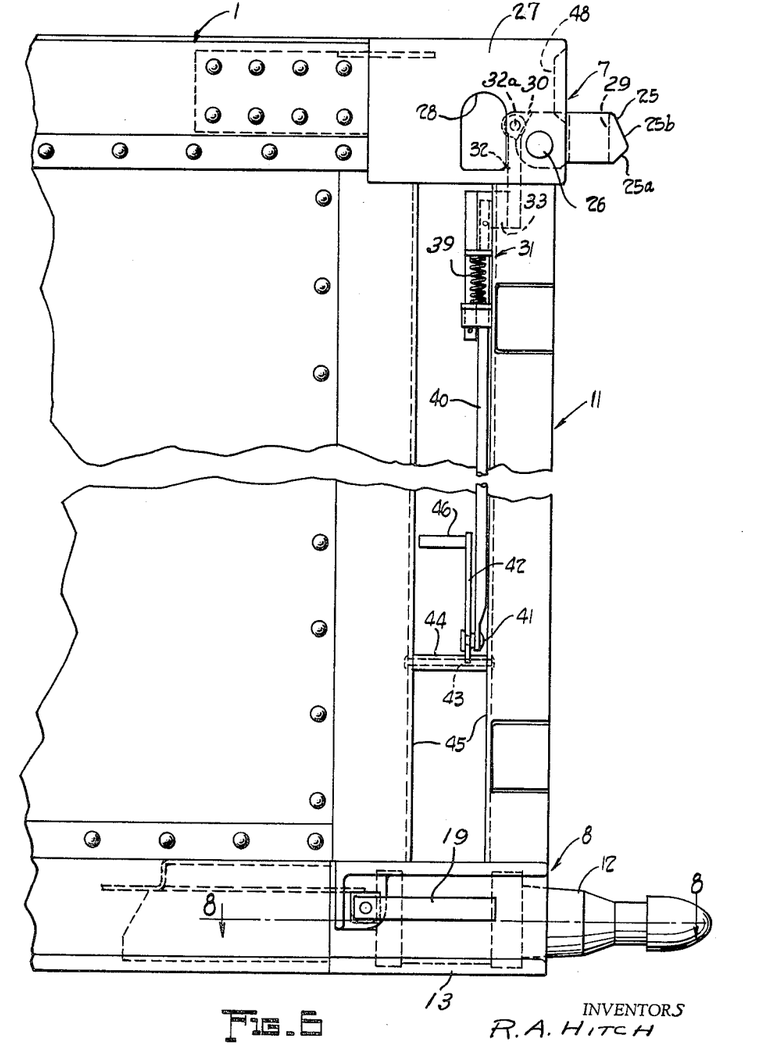
FIGURE 6 is an enlarged fragmentary view of a rear section of a container unit with the gathering means and connecting means indicated with certain operating means provided therefor.

Referring now more particularly to FIGURES 6 and 7, and initially to FIGURE 6, the rear end of the container 1 is denoted 11, and incorporates therein at the corners the gathering means which are generally described as shear and tension members, that at the lower corners being first described.

Figure 8:
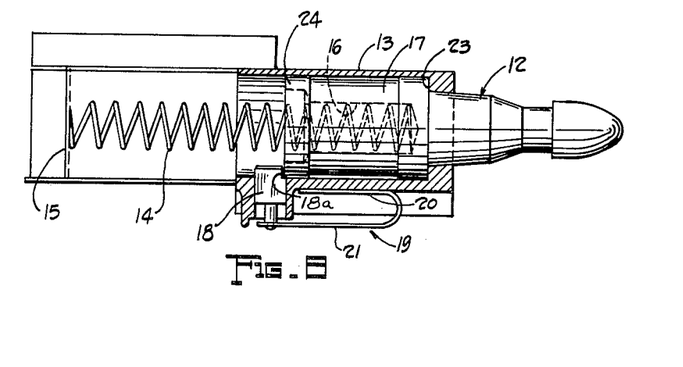
FIGURE 8 is a detail plan view illustrating in section, and particularly disclosing one of the gathering members which is located at a lower corner of the rear of a container.
Figure 10:
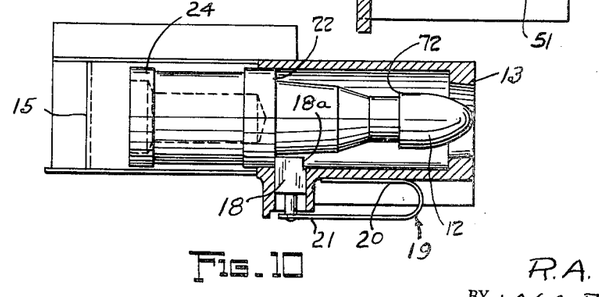
FIGURE 10 is a view similar to FIGURE 8, with the gathering member disclosed therein in its retracted position within the outline or confines of the container unit.

The lower means 8 of the container 1 include the horn-like parts 12 extending outwardly therefrom, the actual construction of this means 8 being illustrated in FIGURES 8 and 10 in greater detail as comprising a housing or corner casting 13 suitably fixed to the container unit and having the horn-like part 12 arranged to reciprocate therein as the same is manipulated by manual manipulation. This manipulation is effected in conjunction with a spring 14 which seats against a transverse wall 15 and in turn is received within a socket 16 shown in dotted lines in the end 17 of the horn-like member 12.

Suitably arranged in the casting 13, is a detent 18 which is connected to a U-shaped spring 19, the arm 20 thereof being fastened to the casting as by welding or similar connection with the free end 21 acting to cause the detent 18 to assume the position shown in FIGURE 8 normally. By manipulation of the portion 21 or leg 21 it will be apparent that this detent may be moved outwardly or downwardly as viewed in FIGURE 8 so that thereafter the horn-like part 12 may be forced to the left as viewed in the said figure into the position shown in FIGURE 10 to thereby be completely retracted within the casting 13. The detent 18 is thereupon permitted to move into engagement with the shoulder 22 to thereby retain the horn-like part 12 in its retracted position as viewed in the said FIGURE 10, of course compressing the spring 14 during such manipulation.

When it is desired to permit the horn-like part 12 to be extended or positioned as shown in FIGURE 8, manipulation of the portion 21 of the part 19 may be resorted to whereby the detent 18 is withdrawn and the part 12 expelled by spring 14 so that the shoulder 22 is moved into position behind a corresponding shoulder 23 of the casting 13. Thereafter detent 18 which is square, upon release moves behind the end 24 the shoulder 18a thereof engaging the end, the horn-like part 12 being thereby maintained in its extended position for its gathering operation as will be set forth subsequently.

It should be explained that the horn-like part 12 may be removed by removing the member 15 so that the part may be withdrawn from in rear of the casting 13 if that be thought desirable and thus a loose horn-like part is made available if necessary, the purpose of the retracting and extending action being obvious so that the horn-like part 12 may be taken out of a position wherein it might cause obstruction, since it will be within the envelope dimensions or outline of the container as will be readily understood.

It will be also understood that this identical arrangement is provided at the rear of the container 2 in a corresponding position to that disclosed in FIGURE 6 in reference to the container 1.

Figure 14:
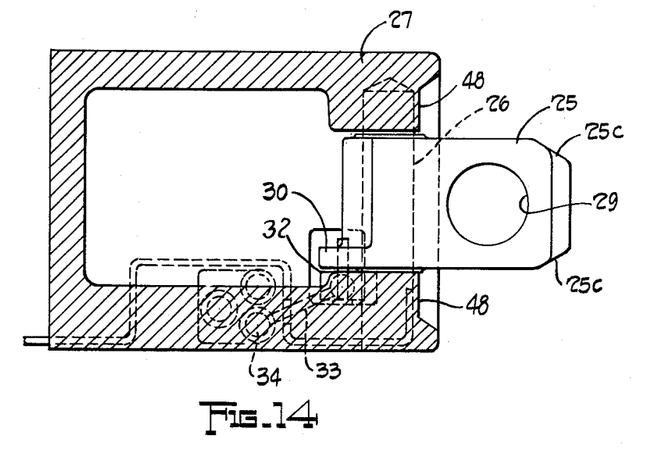
FIGURE 14 is a fragmentary sectional view taken about on the line 14—14 of FIGURE 12 looking in the direction of the arrows.

At the upper portion of the rear end 11 of the container unit 1, another of the shear and tension members is shown, in this case being primarily a tension link 25, which is shown in FIGURE 14 in plan as a tongue-like member with the end in the shape of a cam surface with the portions 25a and 25b, the corners as illustrated in FIGURE 14 being beveled at 25c.

The tongue-like part 25 is pivotally mounted on a pivot 26 extending transversely of a corner casting 27 which corner casting 27 includes certain openings such as 28 which may be used for lifting purposes by the insertion of a suitable hook thereinto when the container unit 1 is to be raised by a crane or similar instrumentality, it being pointed out that the upper corner castings all have similar openings therein for engagement with a hook likewise.

The tongue-like part 25 is provided with an opening 29 adapted to engage with a boss to be described more specifically subsequently.

The tongue-like part 25 is also provided with an off-standing ear 30 which is in turn connected to a spring loaded connection generally designated 31 of which the upwardly extending arm 32 is a part. The arm 32 is provided with an off-standing member 33 which is in turn fastened to a downwardly extending cylindrical part 34. The parts now being described are more clearly shown in FIGURE 12, the part 34 including the off-standing spring seat 35 fixed to the part 34 and the cylindrical part 34 terminates at 36 with a stop 37 thereon, on which is slidably positioned a further spring seat 38 the spring 39 being interposed between the spring seats 35 and 38.

The spring seat 38 is mounted at the upper end of a rod 40, the lower end of the rod 40 being pivotally connected at 41 to a toggle lever 42 which is pivotally engaged at 43 with a pivot 44 suitably supported within a channel 45, forming a portion of the corner section of the container unit 1.

Figure 12:
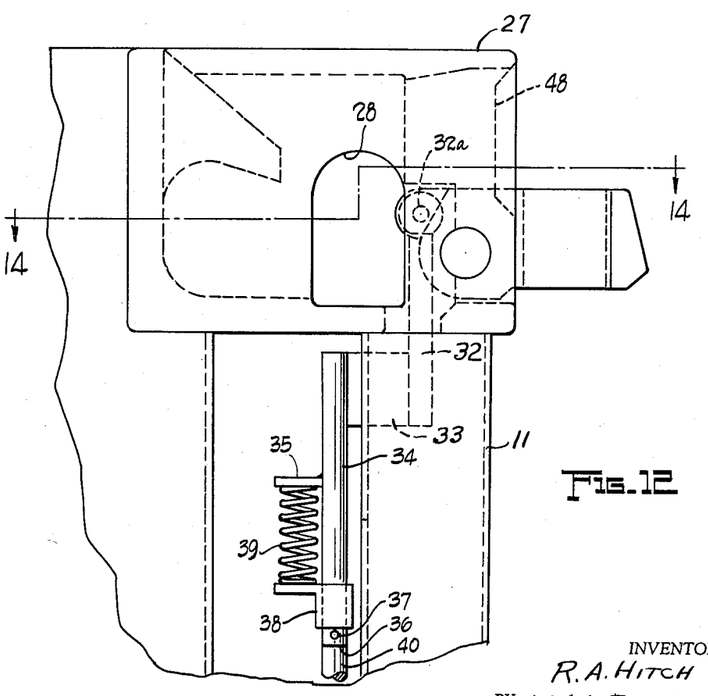
FIGURE 12 is an enlarged view, fragmentary in nature illustrating certain of the gathering means arranged at the upper portion of the rear of a container unit, with the gathering member thereof comprising a tongue-like member extending outwardly.

The toggle lever 42 by manipulation around the pivot 43 using the handle 46 therefor, will cause the rod 40 to be raised and lowered, and acting through the spring 39 in turn raise and lower the rod-like part 32 which is connected pivotally at 32a to the extension 30 of the tongue-like part 25, whereby the part 25 may be pivoted into position so that it no longer extends outwardly as indicated in FIGURES 6 and 12 but on the other hand is retracted or pivotally moved into the casting comprising the upper corner member, said casting being denoted 28a. The tongue-like member 25 will thereby of course be moved out of a position in which it could act as an obstruction or an objectionable extension from the casting, the manipulation or operation of this tongue-like part to be described subsequently.

Figure 13:
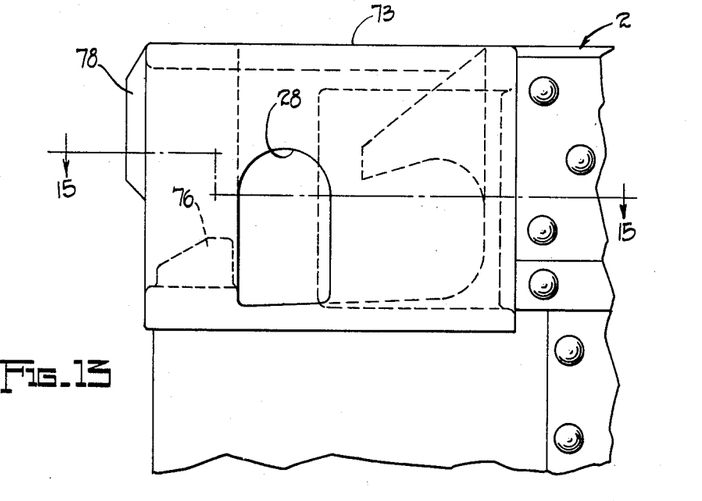
FIGURE 13 is the mating gathering member to that disclosed in FIGURE 12, located on the forward upper corner of a container and suggesting the inter engaging elements of the respective members.

It should be further noted that the casting 28a includes certain vertically extending grooves indicated at 48, extending vertically along side the opening through which the tongue-like part 25 extends, such grooves being intended as locating means for corresponding parts subsequently to be disclosed in greater detail in reference to FIGURE 7 and FIGURE 13.

Figure 11:
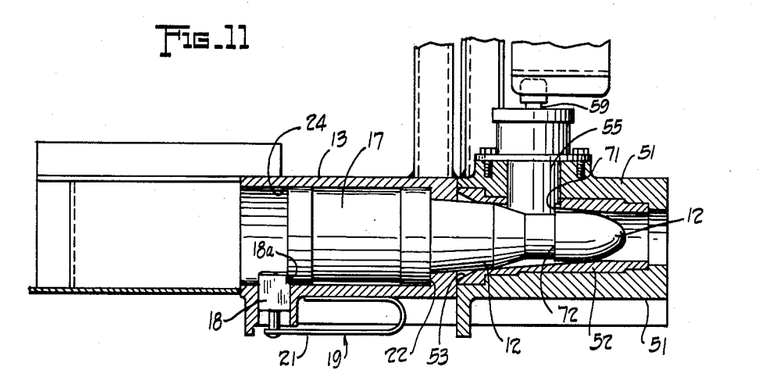
FIGURE 11 is a fragmentary view largely in section illustrating the gathering members in their inter engaged condition as when the containers are arranged in juxtaposition.

Referring now to FIGURE 7, the front end 50 of the container unit 2, includes the other portions of gathering members 9 and 10 previously referred to, the member 10 including a casting 51 more particularly illustrated in FIGURE 11, mounted at the lower corner, there being one of these at each of the lower corners and including the female or mating member 52 therein, this member having a conical opening therein to receive the horn-like member 12 previously referred to. The conically shaped member 52 includes the enlarged outer portion 53, whereby in view of the tapered nature of the horn-like member 12, will cause the centering and subsequent positioning of the member 12 in the portion 52.

Figure 9:
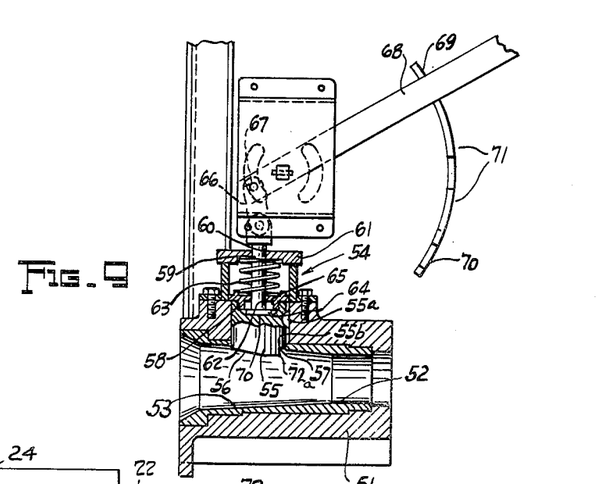
FIGURE 9 is a fragmentary plan view illustrating the latch means for the mating gathering member to that disclosed in FIGURE 8, being located at the lower corner of the forward portion or front of a container.

In order to retain the member 12 in its connected condition and thereby retain the containers in adjoining juxtaposition, a suitable latch structure is provided, shown in greater detail in FIGURE 9 as to the operative elements thereof and now described.

This latch structure generally designated 54 includes a plunger 55 having the beveled portion 56 extending into the member 52 which is really a socket-like member and guided in an opening 57 formed at the inner side of the casting 51. Key 55a moving in keyway 55b prevents rotation of plunger 55. Structurally this plunger 55 is provided with a threaded member 58 through which extends a plunger actuator 59 which is guided in an opening 60 formed in a spring seat member 61 and in the threaded member 58 a similar opening 62 is provided, the spring 63 being seated between the member 61 and the threaded member 58 previously referred to. The member 60 has a head 64 at its extremity which is arranged to move in a socket 65 formed in the threaded member 58 whereby to permit some relative movemnet of the member 55 with relation to the operating part 59.

The operating part 59 is in turn connected to a link 66 which is itself pivotally engaged at 67 to a lever 68 whereby the plunger 59 is moved inwardly and outwardly and by means of detents 69 and 70 retained in the various positions to which the same may be moved or alternatively between other detents 71 which in effect provide a sort of neutral position.

This neutral position referred to, moves the head 64 away from impingement with the bottom 70 provided in the plunger 55 and permits relative movement of the respective parts, with the plunger 55 thereby maintained in the position shown by pressure of spring 63 when the lever 68 is between the detents 71.

When the lever 68 is in between the detents 71, the horn-like part 12 is permitted to move into the socket provided by the part 52 and pressing the plunger 55 against the spring 63 until the shoulder 71 of the plunger 55 moves into position behind the shoulder 72 of the horn-like member 12. This is clearly illustrated in FIGURE 11, and thus the horn-like member 12 is retained in the position shown.

When the parts are in the positions of FIGURE 11, with the plunger 55 and the shoulder 71 thereon behind the shoulder 72 of the horn-like member 12, they are adequately connected. In order to be positive that the plunger 55 will not move out of engagement with the shoulder 72, the lever 68 is moved into the full line position shown in FIGURE 9 whereby the link 66 presses against the member 59 and in turn causes the end 64 of said member to engage against the shoulder or bottom 70 provided in the part 55. Thus since the detents 69 and 71 retain the lever 68 in the position of full lines shown in FIGURE 9, the plunger 55 will not accidentally disengage the horn-like member 12 and thereby permit separation of the containers which are connected by the respective parts just before described.

It will of course be apparent that a similar arrangement is provided at the opposite side of the container 2 at the lower corner thereof and thus the pair of horn-like members 12 are inter engaged with mating members 51 formed in the lower corners and retained in that locked position by the latch mechanism just described in detail.

By manipulating the lever 68 into the position whereby the same is moved between the detent 70 and other detent 71, plunger 55 will be completely withdrawn from its engagement with the horn-like member 12, the spring 63 being compressed, and permit separation of the containers in the manner to be subsequently set forth.

Figure 4:
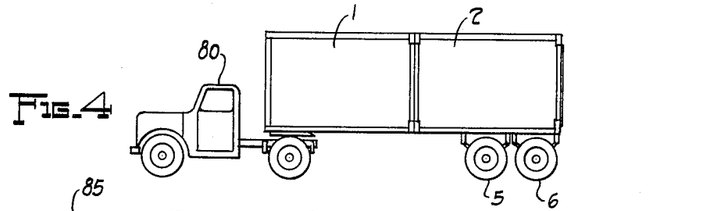

While the just before described interengaging parts including the member 12 and associated or mating castings 51 provides shear and tension connection of the respective containers, in view of the positioning of the containers during their normal operation as a trailer unit along the lines illustrated in FIGURE 4, under certain conditions it is desirable to lock the upper rails or upper portions of the containers together to prevent any separating action even during extreme conditions which would occur where an arching or hog backing of the respective containers could take place.

Figures 15, 16:
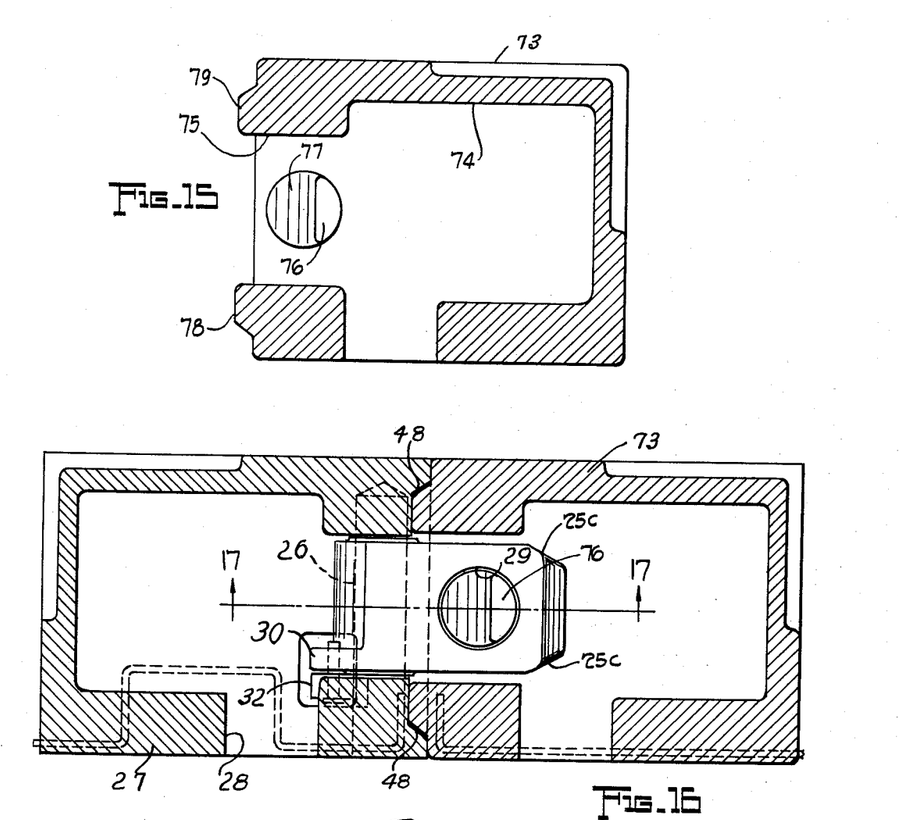
FIGURE 15 is a fragmentary view in section taken about on the line 15—15 of FIGURE 13 looking in the direction of the arrows.
FIGURE 16 is a fragmentary sectional view showing the members of FIGURES 12 and 13 in inter engaged condition in plan and in section.
Figure 17:
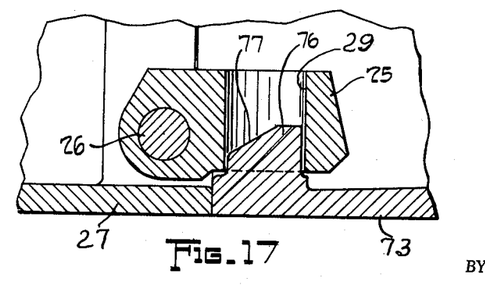
FIGURE 17 is a fragmentary sectional view taken about on the line 17—17 of FIGURE 16 looking in the direction of the arrows.

To the foregoing end, the structure illustrated in FIGURE 6 at the upper corner and denoted 7, is provided, and on the container 2 the mating gathering member or unit 9 is illustrated as comprising a casting 73 shown in somewhat greater detail in section in FIGURES 15, 16 and 17 as comprising a hollowed out portion 74 therein with an entrance opening 75, at which latter opening is an upwardly extending boss 76, the latter having a beveled face 77 thereon, to provide for the camming action of the tongue-like gatherer or member 25 described in greater detail earlier, the latter being pivoted at the pivot 26 likewise mentioned previously.

The casting 73 is also provided with tongues 78 and 79 adapted to be positioned in the grooves 48 previously mentioned likewise, which effects the final alignment and the maintenance of alignment of the members 27 and 73, it likewise being remembered that members of this nature are provided at each of the upper corners which are in juxtaposition. It should also be apparent that the upper rails and upper sections of the container units 1 and 2 are normally in compression when the containers are in the condition illustrated in FIGURE 4 and thus the tongue-like member 25 after having ridden up the surface 77 and over the boss 76 will only occasionally come into action if the hog backing or arching of the respective units takes place, the member 25 thereby being a tension member solely or tension link if necessary. It will also be understood that the member 25 provides for gathering alignment of the respective portions by reason of the beveled edges 25c of the member 25, further facilitating the alignment during the connecting operation.

It is clear that the operating mechanism for the tongue-like member 25, as effected by the toggle 42, will pivot the member 25 into and out of engaging position with the boss 76 so that separation of the respective container units 1 and 2 may be effected when desired under the control of the operator.

Figure 1:
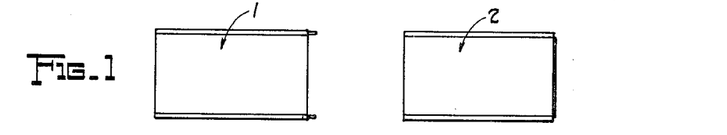
FIGURES 1 to 4 inclusive, are largely diagrammatic illustrating the assembly of separate containers into a trailer body unit and suggesting the order of such assembly, FIGURE 1 being a top plan view of a pair of containers relatively separated, FIGURE 2 a side view showing the containers as trailer units with suitable landing gear and bogies supporting the respective units, FIGURE 3 indicating the manner of assembly of the container units by manipulation of the tractor truck, and FIGURE 4 with the landing gear of the respective units raised, the bogie of the forward container having been moved to the rear and a tandem trailer body provided thereby ready for movement by the tractor.
Figure 2:
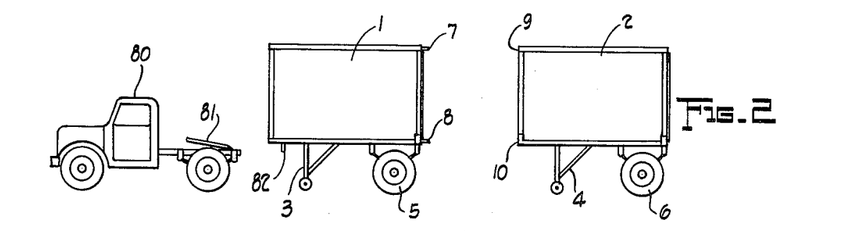
Figure 3:
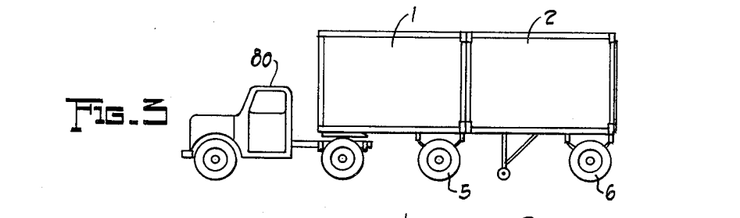

With the foregoing specific description of the actual parts comprising the invention herein, having been made, a description of the operation during connecting and disconnecting will supplement the specific descriptions and is undertaken in reference to FIGURES 2 to 4 inclusive.

With the container 1 mounted on the landing gear 3 and supported at the rear by the bogie 5 including the wheels thereon, in the position in general alignment with the container unit 2 with its landing gear 4 and bogie 6, the tractor 80 may be backed so that the fifth wheel 81 thereon moves under the forward portion of the container 1, engaging the king pin 82 extending therebeneath, and thereafter assumes the condition illustrated in FIGURE 3. Subsequently the landing gear 3 is raised and thereafter the tractor 80 caused to move rearwardly so that the rear end of the container unit 1 and the portions of the tension and shear members denoted 7 and 8 caused to be gathered by and to gather in connection with the tension and shear member portions 9 and 10 so as to be in engagement as indicated in FIGURE 11 for the members 8 and 10, and FIGURE 16 for the members 7 and 9. During this manipulation, the tongue-like member 25 will ride up over the boss 76, and engage therewith, the spring unit described in reference to FIGURE 12 and denoted 39 permitting this overriding effect to take place even though the toggle 42 is in its latched or locked position as it will be and as shown in FIGURE 6.

The horn-like members 12 will have entered the mating sections 51 in the lower corners of the container unit 2 and become latched and fixed in position as shown in FIGURE 11 with the lever 68 moved into the full line position shown in FIGURE 9 after such movement has taken place, the lever initially being positioned between the detents 71 as previously indicated.

Thereafter the landing gear 4 is raised so that it provides an unobstructed lower surface in the container unit 2, and subsequently the bogie 5 slides along the bottom rails of the containers to a position as indicated in FIGURE 4 wherein both bogies are in full rearward position acting as a tandem support for the unit.

When the unit as a whole has assumed the condition shown in FIGURE 4, the members 12 and associated parts 51, will obviously be in tension and act as shear members likewise, with the upper rails of the respective container units 1 and 2 in compression with the tongues 78 and 79 in position engaging the grooves 48 and 48 previously suggested whereby lateral independent movement of the respective container units 1 and 2 is prevented from taking place. Of course the tongue members 25 cooperate in this preventive relative movement but must be arranged so that they can be released when the time comes and thereby certain clearances must be greater than would otherwise be the case.

If during motion of the unit as disclosed in FIGURE 4 over the road and for some reason the upper rails tend to separate or seek to separate, the connection provided as shown in FIGURE 16 will prevent such operation by reason of the tension links 25 and associated bosses 76 with which they are engaged.

When it is desired to use the container units 1 and 2 as purely containers and not assemble the same into a trailer unit, the landing gear may be folded flush under the lower surfaces, that is the landing gear 3 and 4 of the respective units, and the bogies 5 and 6 removed completely therefrom, providing unobstructed lower areas upon which the containers may be positioned. The various openings 28 in the upper corner castings, may be thereafter availed of to provide for lifting and handling the containers or suitable fork lift trucks may be availed of for such purpose, all in accordance with known practice in the container handling field.

Figure 5:
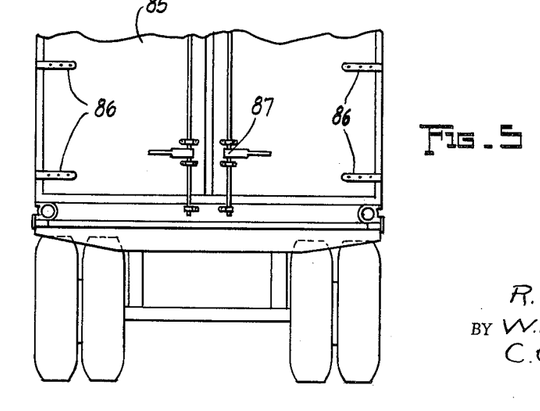
FIGURE 5 is a rear elevational view, fragmentary in nature indicating the location of certain of the gathering means in respect to the trailer body and the wheeled elements thereof.

The container units 1 and 2 will have rear door arrangements preferably as indicated in FIGURE 5 and denoted at 85, these being mounted on suitable hinges such as 86 providing for opening of the same with the usual closure locks 87 being provided.

It will be understood that a reverse manipulation of the respective members previously described in detail as far as assembly of the container units 1 and 2 is concerned may be effected so that separation of the container units into the components as illustrated in FIGURE 2 may be effected if desired and thereby the tractor such as 80 move a container unit 1 acting as a trailer or a container unit 2 acting as a trailer independently thereof.

It is emphasized that the container units 1 and 2 are identical as far as the connections or gathering members or units thereon are provided, there being fore and aft arrangement of these container units in each case of identical construction so that the two containers shown may be assembled or three or four similar containers likewise assembled if found desirable or necessary.

We claim:

1. In body construction of the class described, in combination, at least two container units arranged to be assembled and disassembled, and gathering means at adjoining ends of said units to facilitate such assembly and disassembly, said means including retractable and extensible gathering members in one end to coact with mating gathering members in the adjoining end, certain of said members being structurally formed to operate as guiding parts during assembly of the units and as tension parts when assembly is effected.

2. The combination as claimed in claim 1, wherein other of the gathering members are tension parts only, when portions of the units in which they are positioned are no longer in compression.

3. The combination as claimed in claim 1, wherein parts of the gathering members are mounted with means to make the same extensible and facilitate retraction, means being provided to maintain the same in such positions.

4. The combination as claimed in claim 1, wherein said certain gathering members are located at the lower portions of a unit, and include horn-like parts, mating parts to receive the same are correspondingly located, and means to lock the horn-like parts in extended position are provided.

5. The combination as claimed in claim 4, wherein the mating parts are of funnel-like form and thereby cause the horn-like parts to be centered therein when in fully engaged position.

6. The combination as claimed in claim 1, wherein other of said gathering members are located at the upper portions of the units, said members are pivotally mounted, and control means are provided to operate said members.

7. The combination as claimed in claim 6, wherein the control means include operating parts manipulable from positions at the lower portions of said containers to pivot the said members into and out of position for gathering action.

8. The combination as claimed in claim 7, wherein the operating parts include resilient elements whereby the gathering members connected thereto are yieldable.

9. The combination as claimed in claim 1, wherein other of said gathering members include a tongue-like member in one container unit and a mating member in the adjoining container unit, said tongue-like member being pivotally mounted to facilitate retracting the same.

10. In body construction of the class described, in combination, a pair of container units having their ends in juxtaposition, gathering means at said ends, said means including a pair of horn-like members at the lower corners of one of said ends, said members being adapted for tension and shear engagement with mating members at corresponding corners of the other container, said corners including means to facilitate extension and retraction of the members, and means to lock said members in said positions.

11. The combination as claimed in claim 10, wherein the gathering means include a pair of tongue-like members at the upper corners of one of said ends, said members having portions for engagement with mating members at corresponding corners of the other container unit, and means to move said members into and out of position for such engagement.

12. The combination as claimed in claim 11, wherein the means for moving the member into and out of position include operating parts at the sides of the container unit, said parts having elements for manipulating the parts from positions near the lower portions of the container units, and resilient connections included in said parts.

13. The combination as claimed in claim 10, wherein the horn-like members are provided with means to facilitate positioning the same so as to extend outwardly from the container unit in which they are carried, and said members are retractable within the unit, and the mating members are located in the corners of the other container unit, said lock means including a part to engage the horn-like member and a connecting part and being manipulable from the side of the first named unit.

14. The combination as claimed in claim 11, wherein the means to move the tongue-like members comprise spring loaded links connected therewith, operating links connected to those first mentioned, and toggle means are connected to the latter, whereby to raise and lower the links, to thereby pivot the same members into and out of the positions stated.

15. In body construction of the class described, in combination, a first container unit, gathering means at the front and rear ends thereof, said means comprising male connecting instrumentalities at the rear and female connecting instrumentalities at the front, said instrumentalities comprising members providing for both shear and tension, and a second container unit including like gathering means to those described in reference to the first unit, corresponding connecting instrumentalities being inter-engaged with like instrumentalities of the first unit, means being provided to releaseably maintain such inter-engagement certain of said means having remotely controllable elements connected therewith.

16. The combination as claimed in claim 15, wherein the rear of the first unit is arranged in juxtaposition to the front of the second unit, certain of the shear and tension members comprising horn-like parts mounted at the lower part of said rear, said parts being extensible from and retractable into the said rear and in operable position extending into the mating members of said front, and means for latched connection of said parts and members, said means including operating means for releasing such connection.

17. The combination as claimed in claim 16, wherein other of the shear and tension members comprise tension links only, said links consisting of tongue-like parts extending from the upper rear of said first unit into engagement with mating parts of the front of the second unit, and operating means on said first unit are provided to move said parts into and out of position for the engagement specified.

18. The combination as claimed in claim 16, wherein the horn-like parts are retractable, means being provided to maintain said parts in retracted and extended positions.

References Cited in the file of this patent

UNITED STATES PATENTS

| | | |
|---|---|---|
| 2,972,175 | Abolins | Feb. 21, 1961 |
| 3,015,407 | Fesmire | Jan. 2, 1962 |
| 3,061,134 | Fesmire | Oct. 30, 1962 |

FOREIGN PATENTS

| | | |
|---|---|---|
| 801,745 | Great Britain | Sept. 17, 1958 |